United States Patent
Jang et al.

(10) Patent No.: US 9,461,509 B2
(45) Date of Patent: Oct. 4, 2016

(54) MOTOR HAVING ELECTROMAGNETIC ROTOR

(71) Applicant: NEW MOTECH CO., LTD., Gwangju (KR)

(72) Inventors: Jeong Cheol Jang, Gwangju (KR); Jeong Nam Seo, Gwangju (KR); Kyung Hwan Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 71 days.

(21) Appl. No.: 14/362,131

(22) PCT Filed: Nov. 2, 2012

(86) PCT No.: PCT/KR2012/009144
§ 371 (c)(1),
(2) Date: Jun. 2, 2014

(87) PCT Pub. No.: WO2013/103190
PCT Pub. Date: Jul. 11, 2013

(65) Prior Publication Data
US 2014/0333173 A1  Nov. 13, 2014

(30) Foreign Application Priority Data
Jan. 2, 2012 (KR) .................. 10-2012-0000125

(51) Int. Cl.
*H02K 1/22*  (2006.01)
*H02K 3/52*  (2006.01)
*H02K 19/10* (2006.01)
*H02K 3/34*  (2006.01)
*H02K 1/24*  (2006.01)

(52) U.S. Cl.
CPC ............... *H02K 1/22* (2013.01); *H02K 3/345* (2013.01); *H02K 3/527* (2013.01); *H02K 19/10* (2013.01); *H02K 1/24* (2013.01)

(58) Field of Classification Search
CPC ........ H02K 3/527; H02K 3/345; H02K 1/22; H02K 19/10; H02K 1/24; H02K 16/00; H02K 16/02
USPC ............. 310/216.001–216.56, 112–114
See application file for complete search history.

(56) References Cited

U.S. PATENT DOCUMENTS

| | | | | |
|---|---|---|---|---|
| 7,250,703 B2* | 7/2007 | Nitta | ............... | H02K 1/2786 310/156.53 |
| 2007/0163306 A1 | 7/2007 | Kim et al. | | |
| 2007/0236099 A1* | 10/2007 | Kim | ............... | D06F 37/304 310/266 |
| 2010/0264769 A1* | 10/2010 | Park | ............... | H02K 16/00 310/125 |
| 2011/0247375 A1* | 10/2011 | Lee | ............... | H02K 1/32 68/140 |

FOREIGN PATENT DOCUMENTS

| | | |
|---|---|---|
| JP | 2001-258189 A | 9/2001 |
| JP | 2002-153604 A | 5/2002 |
| JP | 2004-056974 A | 2/2004 |

(Continued)

*Primary Examiner* — Dang Le
*Assistant Examiner* — Leda Pham
(74) *Attorney, Agent, or Firm* — Revolution IP, PLLC

(57) ABSTRACT

Disclosed is a motor including: a rotor housing; a stator assembly located inside the rotor housing; a first core located inside the stator assembly; a second core located at the center of the rotor housing; and a coil housing located inside the rotor housing and having a space portion formed at the inside thereof.

7 Claims, 4 Drawing Sheets

(56) References Cited

FOREIGN PATENT DOCUMENTS

| | | | |
|---|---|---|---|
| JP | 3092159 U9 | 1/2007 |
| JP | 2010-130719 A | 6/2010 |
| KR | 10-0429239 B1 | 4/2004 |
| KR | 10-0657660 B1 | 12/2006 |
| KR | 10-0662387 B1 | 10/2010 |

* cited by examiner

MOTOR HAVING ELECTROMAGNETIC ROTOR

CROSS REFERENCE TO PRIOR APPLICATIONS

This application is a National Stage Application of PCT International Patent Application No. PCT/KR2012/009144 filed on Nov. 2, 2012, under 35 U.S.C. §371, which claims priority to Korean Patent Application No. 10-2012-0000125 filed on Jan. 2, 2012, which are all hereby incorporated by reference in their entirety.

TECHNICAL FIELD

The present invention relates to a motor, and more particularly, to a motor having an electromagnetic rotor wherein in place of permanent magnets, electromagnets are mounted, thereby improving the productivity and performance changeability thereof.

BACKGROUND ART

In general, a motor largely includes a rotor and a stator. Recently, a motor, which is widely used for a drum type washing machine, is a direct-coupled outer rotor type motor wherein the stator is directly coupled to a set of motor and the rotor rotates outside the stator.

Such direct-coupled outer rotor type motors have been disclosed in Japanese Patent Publication Laid-open Nos. 2001-258189, 2002-153604, and 2010-130719 and Korean Patent Nos. 0429239 and 0657660.

According to the conventional practices, the rotor has permanent magnets attached to the inner periphery thereof directly or via other members. However, the coupling process of the rotor to the permanent magnets is very complicated and needs high costs, and even though the coupling process is conducted by means of bonding, the time required for the working is much consumed. Since the magnetic field intensity generated from the rotor is constant, further, the sizes or positions of the permanent magnets should be changed whenever the design components like the number of coil windings of the stator, the change of the size thereof and the change of the material thereof are varied, which causes the adaptability of the rotor to various designs to be substantially low.

So as to problem the above-mentioned problems, accordingly, this inventors have proposed to develop a motor having a new structure where a rotor has electromagnets mounted thereon, in place of the permanent magnets attached thereto.

DISCLOSURE OF INVENTION

Technical Problem

Accordingly, the present invention has been made in view of the above-mentioned problems occurring in the prior art, and it is an object of the present invention to provide a motor having an electromagnetic rotor that is capable of introducing electromagnets into a rotor housing, while having no permanent magnets mounted thereon.

It is another object of the present invention to provide a motor having an electromagnetic rotor that is capable of appropriately controlling the intensity of the magnetic field generated from a rotor in accordance with the variation of the design components of a stator.

It is still another object of the present invention to provide a motor having an electromagnetic rotor that is capable of removing a process of attaching permanent magnets to a rotor housing, thereby allowing the manufacturing process thereof to be simplified and further making the manufacturing time thereof shortened.

The above object and other objects of the present invention will be easily achieved by a preferred embodiment of the present invention as will be described below.

Solution to Problem

To accomplish the above objects, according to an aspect of the present invention, there is provided a motor having an electromagnetic rotor including: a rotor housing; a stator assembly located inside the rotor housing; a first core located inside the stator assembly; a second core located at the center of the rotor housing; and a coil housing located inside the rotor housing and having a space portion formed at the inside thereof.

According to the present invention, desirably, the first core is fixed to a first core holder coupled to a coupling portion bushing of the stator assembly.

According to the present invention, desirably, the second core is fixed to a second core holder coupled to the center of the rotor housing.

According to the present invention, desirably, the first core has a first coil wound thereon and the space portion of the coil housing has a second coil wound thereon.

According to the present invention, desirably, the second coil and the inside wall of the space portion of the coil housing have an insulating layer formed therebetween.

According to the present invention, desirably, the insulating layer is made of an insulating film or has an insulating material coated thereon.

Advantageous Effects of Invention

According to the present invention, the motor having an electromagnetic rotor is capable of introducing electromagnets into the rotor housing, in place of permanent magnets, appropriately controlling the intensity of the magnetic field generated from the rotor in accordance with the variation of the design components of the stator, and removing a process of attaching permanent magnets to the rotor housing, thereby allowing the manufacturing process thereof to be simplified and further making the manufacturing time thereof shortened.

MODE FOR THE INVENTION

Figure 1:
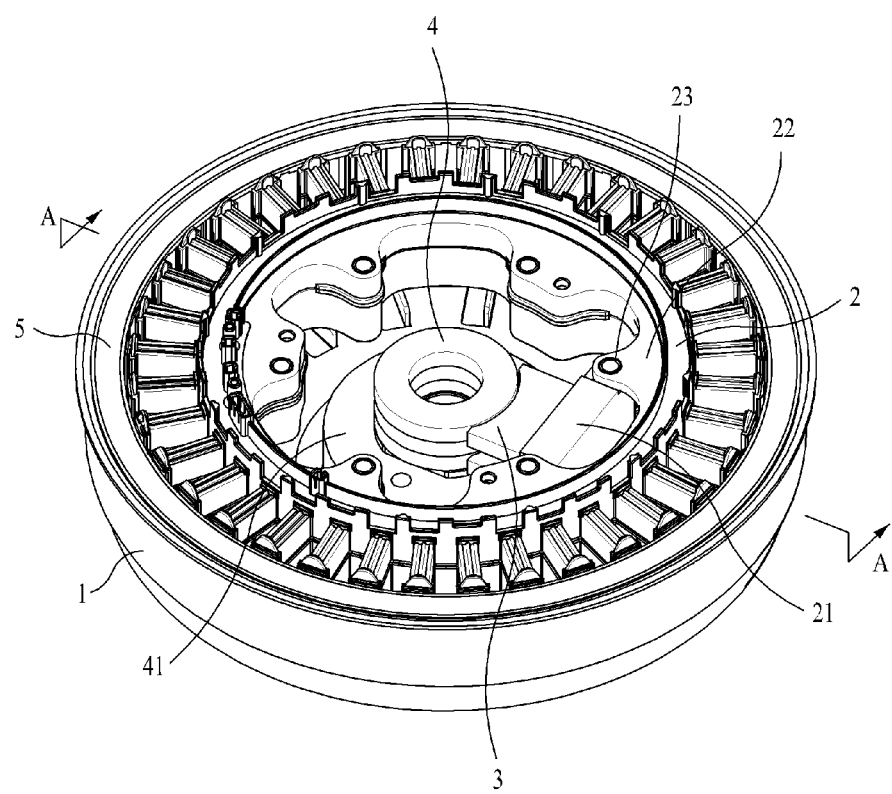
FIG. 1 is a perspective view showing a motor having an electromagnetic rotor according to the present invention.

FIG. 1 is a perspective view showing a motor having an electromagnetic rotor according to the present invention.

As shown in FIG. 1, the motor according to the present invention largely includes a rotor housing 1 and a stator assembly 2.

In case of a conventional motor, a plurality of permanent magnets are attached to the inner periphery of the rotor housing 1, so that the rotor housing 1 is rotated by means of the magnetic field generated from the plurality of permanent magnets and the magnetic force caused from the supply of power to the stator assembly 2. According to the present invention, however, the permanent magnets are not introduced into the inner periphery of the rotor housing 1, and the magnetic field is formed by means of an electrical transformer and the principle of an electromagnet.

Accordingly, a first core 3 is located inside the stator assembly 2, and a second core 4 is at the center of the rotor housing 1. The first core 3 has a first coil wound thereon, and a second coil is wound on a coil housing 5 located inside the rotor housing 1.

The first core 3 is fixed to a first core holder 21. As shown in FIG. 1, the first core holder 21 is coupled together with the stator assembly 2 at the time when bolts are coupled to fastening holes 23 after the first core holder 21 is disposed on coupling portion bushings 22 of the stator assembly 2. Only if the position of the first core holder 21 is formed to fix the first core 3, however, the first core holder 21 is appropriately formed, without having any limit to the above-mentioned position. For example, the first core holder 21 is disposed at a given position of a motor set (not shown) of a washing machine to which the stator assembly 2 is coupled, thereby allowing the first core 3 to be located around the second core 4.

The second core 4 is located at the center of the rotor housing 1 and is rotated together with the rotor housing 1. So as to fix the second core 4 to the rotor housing 1, a second core holder 41 is disposed at the center of the rotor housing 1. The second core 4 is fixed to the second core holder 41 in such a manner as to be rotated together with the rotor housing 1.

The first core 3 serves as a primary core of an electrical transformer, and the second core 4 as a secondary core of the electrical transformer. If an external voltage is applied to the first coil wound on the first core 3, accordingly, a voltage caused by the winding ratio between the first coil and the second coil is applied to the second coil of the second core 4. If an electric current flows by the application of the voltage to the second coil, the coil housing 5 becomes magnetic by means of the magnetic field generated around the second coil. The coil housing 5 generates a magnetic field therefrom, with which it is rotated around the stator assembly 2. According to the present invention, the voltage applied to the second core 4 can be controlled by means of the voltage applied to the first core 3 and the winding ratio between the coils, and accordingly, the magnetic force of the coil housing 5 is controllable appropriately as needed.

Figure 2:
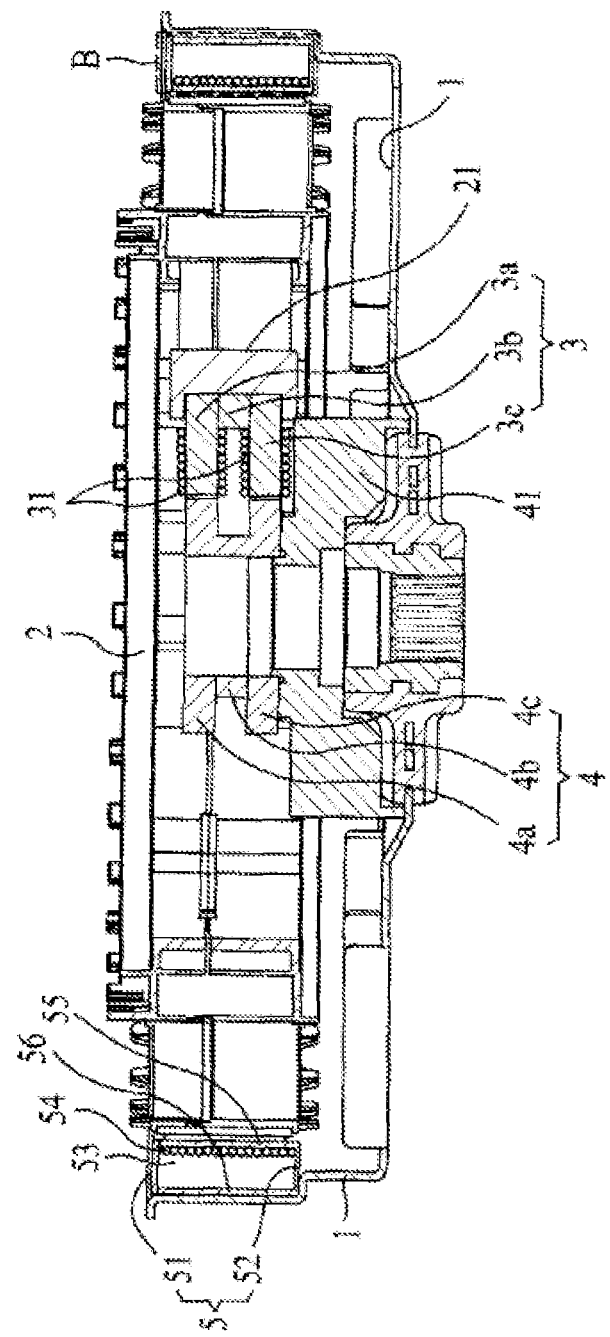
FIG. 2 is a sectional view taken along the line A-A of FIG. 1.

FIG. 2 is a sectional view taken along the line A-A of FIG. 1.

Referring to FIG. 2, the motor according to the present invention will be in detail explained. The stator assembly 2 is located inside the rotor housing 1. The first core 3 is fixed to the first core holder 21 located at one side of the inner surface of the stator assembly 2, and the first core 3 has the first coil 31 wound thereon. Desirably, the first core holder 21 is made of insulating resin.

As shown in FIG. 2, desirably, the first core 3 has a U-shaped section having a first core upper portion 3a, a first core lower portion 3c and a first core intermediate portion 3b connecting the first core upper portion 3a and the first core lower portion 3c. The first core upper portion 3a, the first core intermediate portion 3b and the first core lower portion 3c are formed of an iron core. In this case, they are formed of separate iron cores or one iron core having three portions unitarily formed with each other.

The second core 4 is located at the center of the rotor housing 1, and it is mounted on the second core holder 41 disposed on the center of the rotor housing 1. Desirably, the second core holder 41 is made of plastic resin or an insulating material which is capable of rigidly fixing the second core 2 and further being resistant to a strong rotating force.

As shown in FIG. 2, desirably, the second core 4 has a 'U'-shaped one side section having a second core upper portion 4a, a second core lower portion 4c and a second core intermediate portion 4b connecting the second core upper portion 4a and the second core lower portion 4c. The second core upper portion 4a, the second core intermediate portion 4b and the second core lower portion 4c are formed of an iron core. In this case, they are formed of separate iron cores or one iron core having three portions unitarily formed with each other.

Figure 3:
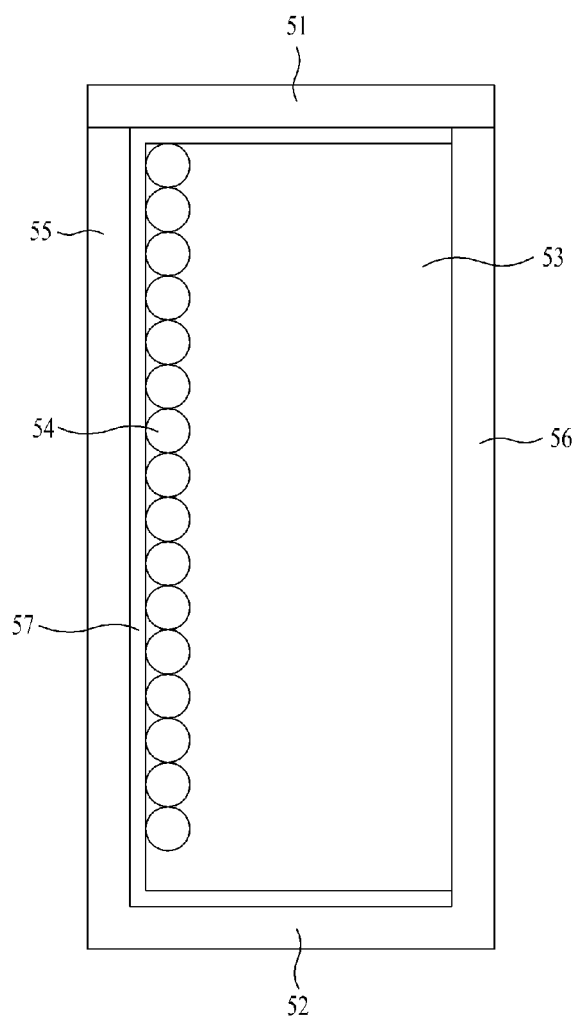
FIG. 3 is an enlarged sectional view showing a portion B of FIG. 2 as a section area of a portion of a coil housing in the motor according to the present invention.

The second coil 54 as the secondary coil is wound on the inner space of the coil housing 5, and the explanation on the second coil 54 will be in detail given with reference to FIG. 3.

FIG. 3 is an enlarged sectional view showing a portion B of FIG. 2 as a section area of a portion of a coil housing in the motor according to the present invention.

As shown in FIG. 3, the coil housing 5 has a coil housing upper portion 51, a coil housing lower portion 52, and a space portion 53 defined by an inside wall 55 and an outside wall 56. Since the coil housing 5 serves as an electromagnet, desirably, it is made of iron.

The second coil 54 is wound on the inside wall 55 in the space portion 53. So as to allow the second coil 54 and the inside wall 55 to be insulated from each other, an insulating layer 57 is formed on the face of the inside wall 55 toward the space portion 53. If needed, the insulating layer 57 may be formed further on the coil housing upper portion 51 or the coil housing lower portion 52. Desirably, the insulating layer 57 is made of an insulating film or has an insulating material coated thereon.

Figure 4:
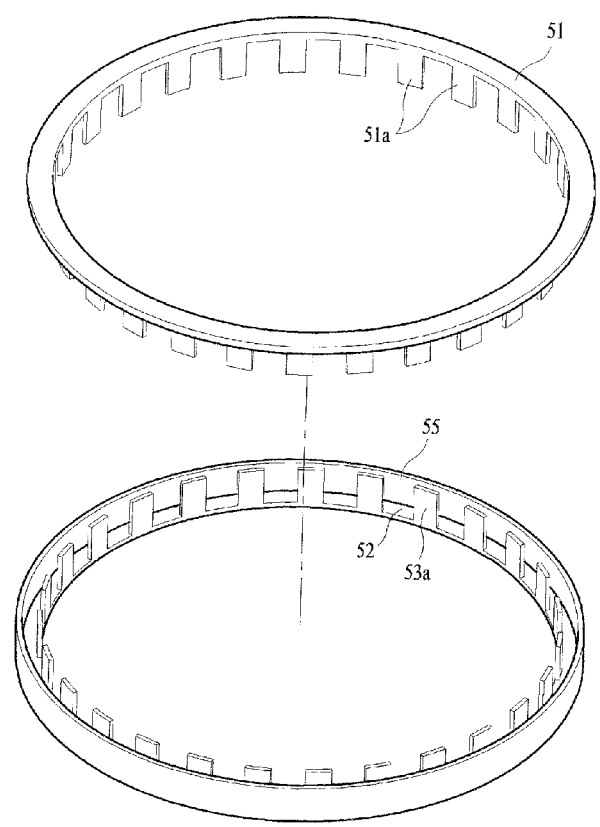
FIG. 4 is an exploded perspective view showing the coil housing used in the electromagnetic rotor according to the present invention.

FIG. 4 is an exploded perspective view showing the coil housing used in the electromagnetic rotor according to the present invention.

As shown in FIG. 4, the coil housing 5 is formed by coupling the coil housing upper portion 51 to the coil housing lower portion 52 having the outside wall 55. The inside wall 54 of the coil housing 5 is formed by alternatingly coupling a plurality of teeth-shaped upper side inside walls 51a formed on the coil housing upper portion 51 with a plurality of teeth-shaped upper side inside walls 52a formed on the coil housing lower portion 52. Like this, the coupling between the coil housing upper portion 51 and the coil housing lower portion 52 forms the space portion 53 of the coil housing 5. In addition to the structure for forming the coil housing 5 as shown in FIG. 4, other structures may be adopted only if the space portion 53 in which the second coil is wound at the inside of the coil housing 5 is formed as shown in FIG. 3.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A motor comprising:
   a rotor housing;
   a stator assembly located inside the rotor housing;
   a first core located inside the stator assembly;
   a second core located at a center of the rotor housing; and
   a coil housing being symmetrically located inside of the rotor housing, the coil housing having an upper portion, a lower portion, and an outside wall and an inside wall, wherein
   a space portion is formed at an inside portion of the coil housing thereof,
   wherein the first core is fixed to a first core holder coupled to a coupling portion bushing of the stator assembly.

2. A motor comprising:
   a rotor housing;
   a stator assembly located inside the rotor housing;
   a first core located inside the stator assembly;
   a second core located at a center of the rotor housing; and
   a coil housing being symmetrically located inside of the rotor housing, the coil housing having an upper portion, a lower portion, and an outside wall and an inside wall,
   wherein a space portion is formed at an inside portion of the coil housing thereof,
   wherein the second core is fixed to a second core holder coupled to the center of the rotor housing.

3. The motor according to claim 1, wherein the first core has a first coil wound thereon, and the space portion of the coil housing has a second coil wound thereon.

4. The motor according to claim 3, wherein the second coil and the inside wall of the space portion of the coil housing have an insulating layer formed therebetween.

5. The motor according to claim 4, wherein the insulating layer is made of an insulating film or has an insulating material coated thereon.

6. The motor according to claim 3, wherein
   voltage applied to the second core is controlled by the voltage applied to the first core and the winding ratio between the first and second coils, and wherein
   the magnetic force of the coil housing is controlled.

7. A motor comprising:
   a rotor housing;
   a stator assembly located inside the rotor housing;
   a first core located inside the stator assembly;
   a second core located at a center of the rotor housing; and
   a coil housing being symmetrically located inside of the rotor housing, the coil housing having an upper portion, a lower portion, and an outside wall and an inside wall,
   wherein a space portion is formed at an inside portion of the coil housing thereof,
   wherein
   the coil housing is formed by coupling the upper portion to the lower portion, wherein the upper portion is formed by a plurality of teeth-shaped walls and the lower portion is formed by a plurality of teeth-shaped walls, and wherein
   the upper portion of the coil housing is alternatively coupled to the lower portion of the coil housing.

* * * * *